(12) United States Patent
Ye et al.

(10) Patent No.: US 10,232,475 B2
(45) Date of Patent: Mar. 19, 2019

(54) DEVICE FOR AUTOMATICALLY MOUNTING SCREW AND AUTOMATICALLY MOUNTING SYSTEM

(71) Applicant: SHENZHEN SKYWORTH-RGB ELECTRONIC CO., LTD., Shenzhen (CN)

(72) Inventors: Chuang Ye, Shenzhen (CN); Wei Wu, Shenzhen (CN); Junzhi Yang, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 250 days.

(21) Appl. No.: 15/413,419

(22) Filed: Jan. 24, 2017

(65) Prior Publication Data
US 2017/0157724 A1 Jun. 8, 2017

Related U.S. Application Data

(63) Continuation of application No. PCT/CN2016/075869, filed on Mar. 8, 2016.

(30) Foreign Application Priority Data

Dec. 2, 2015 (CN) .......................... 2015 1 0875440

(51) Int. Cl.
*B23P 19/00* (2006.01)
*B23P 19/04* (2006.01)
(Continued)

(52) U.S. Cl.
CPC ............. *B23P 19/04* (2013.01); *B23P 19/001* (2013.01); *B23P 19/06* (2013.01); *B23P 19/105* (2013.01);
(Continued)

(58) Field of Classification Search
CPC ..... B23P 19/001; B23P 19/002; B23P 19/004; B23P 19/005; B23P 19/006; B23P 19/007;
(Continued)

(56) References Cited

U.S. PATENT DOCUMENTS 4,455,044 A * 6/1984 Musits .................... B23P 19/02
294/113
4,587,703 A * 5/1986 Azizi ...................... B23P 19/04
198/418.1

(Continued)

FOREIGN PATENT DOCUMENTS

CN 201304561 Y 9/2009
CN 102218655 A 10/2011
(Continued)

OTHER PUBLICATIONS

CN201510875440.6 Search Report (dated Apr. 27, 2017) (in Chinese).

(Continued)

*Primary Examiner* — Jason L Vaughan
(74) *Attorney, Agent, or Firm* — W&K IP

(57) ABSTRACT

The invention discloses a device for automatically assembling screw and an automatically assembling system, the device includes a frame, a locating member, a taking member, a driving member and a screw feeding member: the locating member is for locating a product to special position; the taking member includes a rotating plate, at least three sucking elements fixed below the rotating member and located at a same circumference, and an electric screwdriver connected with the driving member and located upon the circumference; the driving member drives the rotating plate rotating, the electric screwdriver is movably located on the driving member; the screw feeding member includes a feeding plate including feeding positions, each feeding (Continued)

position corresponds to one sucking element; the driving member drives the sucking element acquiring the screw, and drives the sucking element moving the acquired screw to a position for the electric screwdriver assembling the screw to the product.

20 Claims, 7 Drawing Sheets

(51) Int. Cl.
    *B23P 19/06*     (2006.01)
    *B23P 19/10*     (2006.01)

(52) U.S. Cl.
    CPC .... *Y10T 29/53313* (2015.01); *Y10T 29/53374* (2015.01); *Y10T 29/53383* (2015.01)

(58) Field of Classification Search
    CPC ......... B23P 19/04; B23P 19/06; B23P 19/069; B25B 23/02; B25B 23/04; B25B 23/10; Y10T 29/53374; Y10T 29/53383; Y10T 29/53313
    See application file for complete search history.

(56) References Cited

U.S. PATENT DOCUMENTS

| | | | | |
|---|---|---|---|---|
| 4,615,112 A * | 10/1986 | Shannon | ............... | B23P 19/001 209/929 |
| 4,662,053 A * | 5/1987 | Aceti | ............... | B23P 15/14 198/418.1 |
| 4,672,866 A * | 6/1987 | Riera | ............... | B23P 19/006 81/430 |
| 4,700,471 A * | 10/1987 | Shemeta | ............... | A41H 37/10 221/171 |
| 4,773,156 A * | 9/1988 | Kurita | ............... | B23P 19/06 198/339.1 |
| 4,782,726 A * | 11/1988 | Ryder | ............... | B23P 19/06 81/57.24 |
| 4,910,859 A * | 3/1990 | Holcomb | ............... | B23P 19/006 29/564.2 |
| 5,095,615 A * | 3/1992 | Weon | ............... | B23P 19/004 29/785 |
| 5,586,387 A * | 12/1996 | Nakatani | ............... | B23P 21/00 29/703 |
| 6,196,414 B1 * | 3/2001 | Ferenczi | ............... | B21J 15/32 221/123 |
| 6,264,063 B1 * | 7/2001 | Turner | ............... | B23P 19/002 221/165 |
| 6,266,871 B1 * | 7/2001 | Edwards | ............... | B21J 15/323 29/243.53 |
| 6,519,837 B1 * | 2/2003 | Ichikawa | ............... | B23P 21/004 29/720 |
| 8,147,169 B1 * | 4/2012 | Kvalheim | ............... | B65G 65/36 406/109 |
| 8,805,575 B1 * | 8/2014 | Bloch | ............... | B21J 15/32 221/1 |
| 9,079,275 B2 | 7/2015 | Ota et al. | | |
| 9,133,002 B1 * | 9/2015 | Eller | ............... | B21B 41/00 |
| 9,789,572 B1 * | 10/2017 | Cheung | ............... | B23P 21/004 |
| 9,937,623 B2 * | 4/2018 | Vasquez | ............... | B25J 9/1687 |
| 2003/0034355 A1 * | 2/2003 | Bloch | ............... | B21J 15/32 221/13 |
| 2006/0185149 A1 * | 8/2006 | Erdman | ............... | B23P 19/003 29/525.01 |
| 2007/0084039 A1 * | 4/2007 | Bloch | ............... | B21J 15/32 29/525.01 |
| 2008/0000815 A1 * | 1/2008 | Deppermann | ............... | B07C 5/3425 209/552 |
| 2008/0244888 A1 * | 10/2008 | Sarh | ............... | B21J 15/14 29/402.01 |
| 2011/0048649 A1 * | 3/2011 | Komatsu | ............... | B23P 19/069 157/1.35 |
| 2012/0059517 A1 * | 3/2012 | Nomura | ............... | B25J 9/1612 700/259 |
| 2013/0199010 A1 * | 8/2013 | Osato | ............... | B23Q 1/00 29/283 |
| 2013/0340573 A1 * | 12/2013 | Lee | ............... | B23P 19/06 81/57.37 |
| 2014/0377018 A1 * | 12/2014 | Stepan | ............... | B65G 51/04 406/188 |
| 2015/0249029 A1 * | 9/2015 | Sharrock | ............... | H01L 21/67173 414/217 |
| 2016/0096242 A1 * | 4/2016 | Beaty | ............... | B23P 19/005 29/525.11 |
| 2017/0066592 A1 * | 3/2017 | Bastian, II | ............... | B66F 9/063 |
| 2018/0029234 A1 * | 2/2018 | Ueda | ............... | B25J 9/1687 |
| 2018/0029729 A1 * | 2/2018 | Kim | ............... | B65B 3/04 |

FOREIGN PATENT DOCUMENTS

| | | |
|---|---|---|
| CN | 203141196 U | 8/2013 |
| CN | 203236200 U | 10/2013 |
| CN | 103753201 Y | 4/2014 |
| CN | 104801962 A | 7/2015 |
| JP | 62136325 A | 6/1987 |

OTHER PUBLICATIONS

OA of CN201510875440.6 dated Dec. 1, 2017 (in Chinese).
PCT/CN2016/075869 International Search Report (dated Sep. 13, 2016) (in Chinese).

* cited by examiner

DEVICE FOR AUTOMATICALLY MOUNTING SCREW AND AUTOMATICALLY MOUNTING SYSTEM

CROSS-REFERENCE TO RELATED APPLICATIONS

This application is a continuation of International Patent Application No. PCT/CN2016/075869 with a filing date of Mar. 8, 2016, designating the United States, now pending, and further claims priority to Chinese Patent Application No. 201510875440.6 with a filing date of Dec. 2, 2015. The content of the aforementioned application, including any intervening amendments thereto, are incorporated herein by reference.

TECHNICAL FIELD

The present disclosure relates to the field of screw mounting technologies, and in particular, to a device for automatically mounting screw and an automatically mounting system.

BACKGROUND OF THE PRESENT INVENTION

The back cover of the electronic product such as the television, and other components are normally fixed with each other through screws. Currently, in the whole product production line of this kind of electronic product, components are normally fixed with each other through the screws by manual. However, in recent years, the labor cost sharply rises, which causes that the labor cost of mounting screw by manual sharply rises, and the consistency of the product are low due to workers' physical qualities and emotions, furthermore when workers works for a long time, the mounting efficient reduces due to fatigue.

SUMMARY OF PRESENT INVENTION

The main aim of the present disclosure is providing a device for automatically assembling screw, which aims to replace the manual by the device for automatically assembling screw to realize assembling the screw on the product ready to be assembled, such that the production cost is reduced, the production efficiency and the product quality are improved.

In order to achieve the above aim, the device for automatically assembling screw provided by the present disclosure includes a frame, a locating member located on the frame, a taking member, a driving member and a screw feeding member:

the locating member is used for locating the product ready to be assembled to a special position;

the taking member includes a rotating plate connected with the driving member, at least three sucking elements fixed below the rotating member and located at a same circumference, and an electric screwdriver connected with the driving member and located upon the circumference; the driving member drives the rotating plate rotating, the electric screwdriver is movably located on the driving member;

the screw feeding member includes a feeding plate, the feeding plate corresponding to each one sucking element includes one feeding position;

the driving member drives the sucking element acquiring the screw from corresponding feeding position, and drives the sucking element moving the acquired screw to a position which is upon an assembling position of the product ready to be assembled, for the electric screwdriver assembling the screw to the product ready to be assembled.

Preferably, the sucking member includes a sleeve fixing block fixed on the rotating plate, a sleeve fixed on the sleeve fixing block and vertically set, a sucking nozzle located at a bottom of the sleeve, and a bottom batch rod, a lower end of the bottom batch rod is movably sheathed in the sleeve, the bottom batch rod is vertically set, the sleeve fixing block has a venting interface connected with the sleeve, the venting interface is used for connecting with an external windpipe.

Preferably, the taking member further includes a solenoid valve corresponding to the windpipe on the venting interface, the solenoid valve is used for controlling a venting state of corresponding pipe.

Preferably, the sucking members are uniformly located at the circumference.

Preferably, the driving member is a four axis robot, the rotating plate is movably connected with an end of the four axis robot;

the taking member further includes a connecting plate fixed on the end of the four axis robot, a first guide rail fixed with the connecting plate and vertically set, an electric screwdriver fixing plate movably connected with the first guide rail, a first driving element fixed on the connecting plate, the electric screwdriver is fixed on the electric screwdriver fixing plate, an a lower end of the electric screwdriver has the top batch rod which is vertically set, the top batch rod is right above the bottom batch rod;

the first driving element drives the electric screwdriver fixing plate moving on the first guide rail, for bringing the electric screwdriver to vertically move, such that a bottom end of the top batch rod is connected with a top end of the bottom batch rod.

Preferably, the end of the four axis robot has a rotating connector used for connecting with an external main pipe, and a conductive slip ring used for connecting with an electric wire.

Preferably, the screw feeding member further includes an ejecting member located right under the feeding plate, the ejecting member corresponding to each feeding position includes one electromagnetic putter.

Preferably, the locating member includes a first roller plate, a second roller plate, a third roller plate, a second guide rail, a second air cylinder, a third guide rail, a third air cylinder, a fourth guide rail, a fourth air cylinder, a fifth guide rail and a fifth air cylinder, the first roller plate is horizontally set along a lateral direction, the second roller plate, the second guide rail, and the second air cylinder are all located at an end of the first roller plate along the lateral direction, the third roller plate, the third guide rail and the third air cylinder are all located an opposite end of the first roller plate along the lateral direction, and the second roller plate and the third roller plate are horizontally set along a vertical direction, the second guide rail, the second air cylinder, the third guide rail and the third air cylinder are vertically set, the fourth guide rail, the fourth air cylinder, the fifth guide rail and the fifth air cylinder are all located at a side of the first roller plate along the lateral direction;

the second roller plate is movably connected with the second guide rail, and the second roller plate is fixed with an end of a driving shaft of the second air cylinder, the second air cylinder is used for driving the second roller plate vertically moving along the second guide rail; the second guide rail is movably connected with the fourth guide rail, and the second guide rail is fixed with an end of a driving shaft of the fourth air cylinder, the fourth air cylinder is used for driving the second guide rail horizontally moving along the fourth guide rail;

the third roller plate is movably connected with the third guide rail, and the third roller plate is fixed with an end of a driving shaft of the third air cylinder, the third air cylinder is used for driving the third roller plate vertically moving along the third guide rail; the third guide rail is movably connected with the fifth guide rail, and the third guide rail is fixed with an end of a driving shaft of the fifth air cylinder, the fifth air cylinder is used for driving the third guide rail horizontally moving along the fifth guide rail.

Preferably, the locating member further includes a side-pushing device used for pushing the product ready to be assembled to be contacted with a surface of the first roller plate, the side-pushing device includes: an assembling plate vertically set along a lateral direction, a supporting rod located at a bottom end of the assembling plate, a T shaped pushing rod located at a top end of the assembling plate, a fourth roller plate and a fifth roller plate horizontally set along the lateral direction, a sixth air cylinder horizontally set along a vertical direction; the T shaped pushing rod includes a cross bar horizontally set along the lateral direction, and a vertical bar horizontally set along the vertical direction, the fourth roller plate and the fifth roller plate are located at the cross bar and separately located at two opposite sides of the cross bar;

a top end of the assembling plate has a six guide rail, the vertical bar is movably connected with the sixth guide rail, and the cross bar is fixed with an end of a driving shaft of the sixth air cylinder, the sixth air cylinder is used for driving the T shaped pushing rod horizontally moving along the vertical direction.

The present disclosure also provides an automatically assembling system, which includes an assembling line body, a plurality of placing plates located at the assembling line body and used for placing product ready to be assembled, and a device for automatically assembling screw, the device for automatically assembling screw corresponds to positions of the placing plates;

the device for automatically assembling screw includes a frame, a locating member located on the frame, a taking member, a driving member and a screw feeding member: the locating member is used for locating the product ready to be assembled to a special position; the taking member includes a rotating plate connected with the driving member, at least three sucking elements fixed below the rotating member and located at a same circumference, and an electric screwdriver connected with the driving member and located upon the circumference; the driving member drives the rotating plate rotating, the electric screwdriver is movably located on the driving member; the screw feeding member comprising a feeding plate, the feeding plate corresponding to each one sucking element includes one feeding position; the driving member drives the sucking element acquiring the screw from corresponding feeding position, and drives the sucking element moving the acquired screw to a position which is upon an assembling position of the product ready to be assembled, for the electric screwdriver assembling the screw to the product ready to be assembled.

Preferably, the sucking member includes a sleeve fixing block fixed on the rotating plate, a sleeve fixed on the sleeve fixing block and vertically set, a sucking nozzle located at a bottom of the sleeve, and a bottom batch rod, a lower end of the bottom batch rod is movably sheathed in the sleeve, the bottom batch rod is vertically set, the sleeve fixing block has a venting interface connected with the sleeve, the venting interface is used for connecting with an external windpipe.

Preferably, the taking member further includes a solenoid valve corresponding to the windpipe on the venting interface, the solenoid valve is used for controlling a venting state of corresponding pipe.

Preferably, the driving member is a four axis robot the rotating plate is movably connected with an end of the four axis robot;

the taking member further includes a connecting plate fixed on the end of the four axis robot, a first guide rail fixed with the connecting plate and vertically set, an electric screwdriver fixing plate movably connected with the first guide rail, a first driving element fixed on the connecting plate, the electric screwdriver is fixed on the electric screwdriver fixing plate, an a lower end of the electric screwdriver has the top batch rod which is vertically set, the top batch rod is right above the bottom batch rod;

the first driving element drives the electric screwdriver fixing plate moving on the first guide rail, for bringing the electric screwdriver to vertically move, such that a bottom end of the top batch rod is connected with a top end of the bottom batch rod.

Preferably, the end of the four axis robot has a rotating connector used for connecting with an external main pipe, and a conductive slip ring used for connecting with an electric wire.

Preferably, the screw feeding member further includes an ejecting member located right under the feeding plate, the ejecting member corresponding to each feeding position includes one electromagnetic putter.

Preferably, the locating member includes a first roller plate, a second roller plate, a third roller plate, a second guide rail, a second air cylinder, a third guide rail, a third air cylinder, a fourth guide rail, a fourth air cylinder, a fifth guide rail and a fifth air cylinder, the first roller plate is horizontally set along a lateral direction, the second roller plate, the second guide rail, and the second air cylinder are all located at an end of the first roller plate along the lateral direction, the third roller plate, the third guide rail and the third air cylinder are all located an opposite end of the first roller plate along the lateral direction, and the second roller plate and the third roller plate are horizontally set along a vertical direction, the second guide rail, the second air cylinder, the third guide rail and the third air cylinder are vertically set, the fourth guide rail, the fourth air cylinder, the fifth guide rail and the fifth air cylinder are all located at a side of the first roller plate along the lateral direction;

the second roller plate is movably connected with the second guide rail, and the second roller plate is fixed with an end of a driving shaft of the second air cylinder, the second air cylinder is used for driving the second roller plate vertically moving along the second guide rail; the second guide rail is movably connected with the fourth guide rail, and the second guide rail is fixed with an end of a driving shaft of the fourth air cylinder, the fourth air cylinder is used for driving the second guide rail horizontally moving along the fourth guide rail;

the third roller plate is movably connected with the third guide rail, and the third roller plate is fixed with an end of a driving shaft of the third air cylinder, the third air cylinder is used for driving the third roller plate vertically moving along the third guide rail; the third guide rail is movably connected with the fifth guide rail, and the third guide rail is fixed with an end of a driving shaft of the fifth air cylinder, the fifth air cylinder is used for driving the third guide rail horizontally moving along the fifth guide rail.

Preferably, the locating member further includes aside-pushing device used for pushing the product ready to be assembled to be contacted with a surface of the first roller plate, the side-pushing device includes: an assembling plate vertically set along a lateral direction, a supporting rod located at a bottom end of the assembling plate, a T shaped pushing rod located at a top end of the assembling plate, a fourth roller plate and a fifth roller plate horizontally set along the lateral direction, a sixth air cylinder horizontally set along a vertical direction; the T shaped pushing rod includes a cross bar horizontally set along the lateral direction, and a vertical bar horizontally set along the vertical direction, the fourth roller plate and the fifth roller plate are located at the cross bar and separately located at two opposite sides of the cross bar;

a top end of the assembling plate has a six guide rail, the vertical bar is movably connected with the sixth guide rail, and the cross bar is fixed with an end of a driving shaft of the sixth air cylinder, the sixth air cylinder is used for driving the T shaped pushing rod horizontally moving along the vertical direction.

The technical proposal of the present disclosure locates the product ready to be assembled to the special position through the locating member, and drives the taking member acquiring the screw from the screw feeding member through the driving member, the whole screw assembling process is full-automatic, no need of manual work, on one hand, labor cost is reduced; on the other hand, the quality problem of the screw assembling is avoid which is caused by issues like workers' physical qualities and emotions, the quality of the product ready to be assembled is improved; on still another the device for automatically assembling screw does not occur the phenomenon of reducing the production efficiency due to fatigue, that is, the screw assembling of the products ready to be assembled can be sustainably proceeded with high efficiency, therefore, the production efficiency of the products ready to be assembled is improved.

DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

Labels illustration for drawings.

TABLE 1

| Label | Name | Label | Name |
|---|---|---|---|
| 1 | assembling line body | 3 | placing plates |
| 4 | stopper | 5 | external main pipe |
| 21 | frame | 22 | locating member |
| 221 | horizontal locating device | 222 | side-pushing device |
| 221a | first roller plate | 221b | second roller plate |
| 221c | third roller plate | 221d | second guide rail |
| 221e | second air cylinder | 221f | third guide rail |
| 221g | third air cylinder | 221h | fourth guide rail |
| 221i | fifth guide rail | 221j | fifth air cylinder |
| 2211 | first locating in place air cylinder | 2212 | second locating in place air cylinder |
| 2213 | third locating in place air cylinder | 222a | assembling plate |
| 222b | supporting rod | 222c | T shaped pushing rod |
| 222d | fourth roller plate | 222e | fifth roller plate |
| 222f | sixth air cylinder | 23 | taking member |
| 231 | rotating plate | 232 | sucking element |
| 232a | sleeve fixing block | 232b | sleeve |
| 232c | sucking nozzle | 232d | bottom batch rod |
| 233 | electric screwdriver | 234 | connecting plate |
| 235 | first guide rail | 236 | electric screwdriver fixing plate |
| 237 | first driving element | 238 | top batch rod |
| 24 | driving member | 241 | rotating connector |
| 25 | screw feeding member | 251 | feeding plate |
| 26 | ejecting member | 261 | electromagnetic putter |
| 27 | position correctional member | 271 | sixth roller plate |
| 272 | seventh guide rail | | |

The realizing of the aim, functional characteristics, advantages of the present disclosure are further described in detail with reference to the accompanying drawings and the embodiments.

DETAILED DESCRIPTION OF PREFERRED EMBODIMENTS

The technical solutions of the embodiments of the present disclosure will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
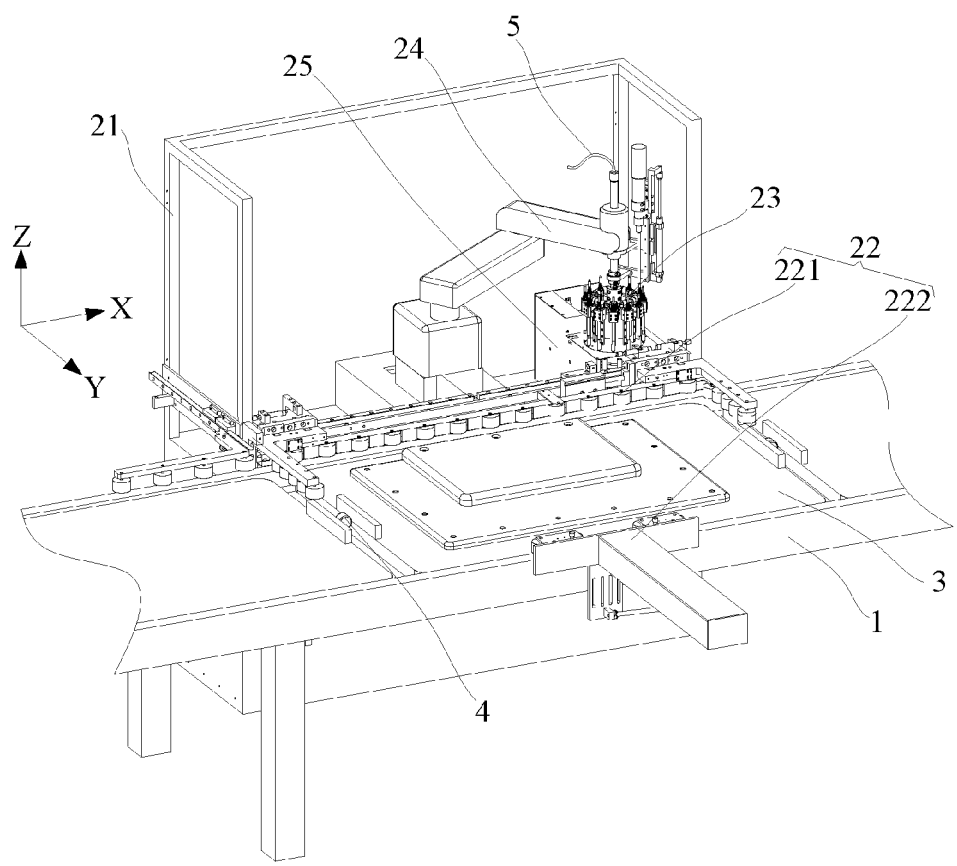
FIG. 1 is a structure diagram of a device for automatically assembling screw provided by an exemplary embodiment of the present disclosure (a state of mounting the device for automatically assembling screw on the automatically assembling system)

It is to be understood that, the established XYZ rectangular coordinates according to FIG. 1 can be defined as that: a side of positive direction of X axis is right, a side of negative direction of X axis is left, and the right and the left can be defined as a horizontal direction; a side of positive direction of Y axis is back, a side of negative direction of Y axis is front, and the back and the front can be defined as a vertically direction; a side of positive direction of Z axis is top, a side of negative direction of Z axis is below. In addition, all the directional instructions of in the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

The present disclosure provides a device for automatically assembling screw, which is used for automatically assembling screw on a product ready to be assembled.

Figure 2:
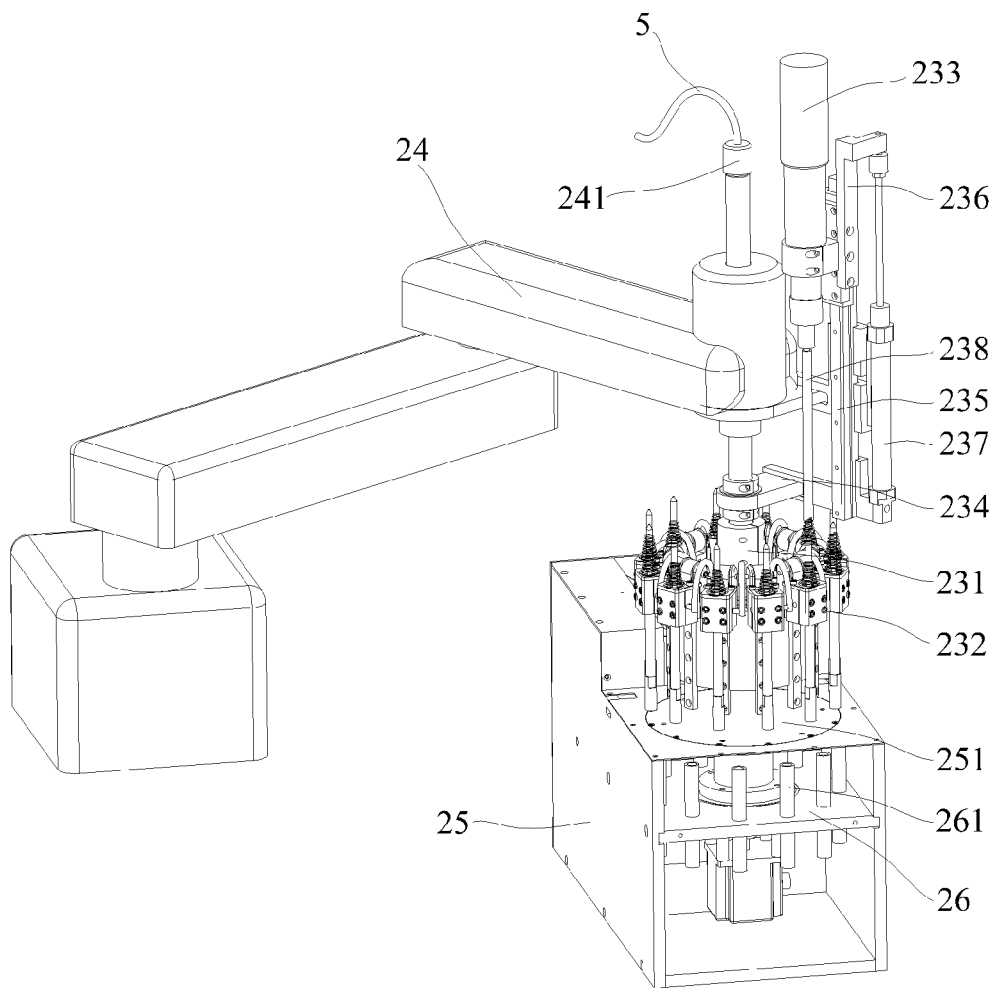
FIG. 2 is a structure diagram of a taking member, a driving member, and a screw feeding member of the device for automatically assembling screw shown in FIG. 1.

Referring to FIGS. 1-2, in an exemplary embodiment, the device for automatically assembling screw includes a frame 21, a locating member 22 located on the frame 21, a taking member 23, a driving member 24 and a screw feeding member 25. The locating member 22 is used for locating the product ready to be assembled to a special position. The taking member 23 includes a rotating plate 231 connected with the driving member 24, at least three sucking elements 232 fixed below the rotating member 231 and located at a same circumference, and an electric screwdriver 233 connected with the driving member 24 and located upon the circumference; in detail, the driving member 24 can drive the rotating plate 231 rotating, the electric screwdriver 233 is movably located on the driving member 24. The screw feeding member 25 includes a feeding plate 251, the feeding plate 251 corresponding to each one sucking element 232 includes one feeding position; During the process of operation, the screw feeding member 25 can enable that each feeding position has screw for being sucked. During the process of operation, the driving member 24 drives the rotating plate 231 and ail of the sucking elements 232 located on the rotating plate 231 moving to corresponding feeding positions for sucking screws first, then drives the electric screwdriver 231 and one sucking element 232 sucking screw moving to one assembling position of the product ready to be assembled, such that the screw can be assembled to the assembling position through the electric screwdriver 233; and then, the driving member 24 drives the whole of the taking member 23 rising to a safety height, and drives the rotating plate 231 rotating, until the other sucking element 232 sucking another screw is located right below the electric screwdriver 233, then the electric screwdriver 233 and the other sucking element 232 is driven to the other assembling position of the product ready to be assembled, such that the other screw can be assembled to the other assembling position through the electric screwdriver 233; and so forth, until the acquired screws are all assembled to the product ready to be assembled.

In the exemplary embodiment, preferably, the rotating plate 231 appears cylindrical shape, all of the sucking elements 232 of the taking member 23 are fixed at a peripheral surface of the plate. It is to be noted that, in the technical proposal of the present disclosure, the number of the sucking element 232 located at the taking member 23 is not limited to three, and can be adjusted according to actual needing, such as, in the exemplary embodiment, the taking member 23 has twelve sucking elements 232. Preferably, all of the sucking elements 232 located at the taking member 23 are uniformly formed at the circumference, so that after each time of assembling one screw, the driving member 24 only needs to drives the rotating plate 231 rotating the same angle, for driving the other sucking element 232 locating right below the electric screwdriver 233. In additional, in the exemplary embodiment, preferably, the driving member 24 is a four axis robot, the four axis robot can neatly realize that the vertical motion and the horizontal motion of the taking member 23, and the arbitrarily moving the rotating plate 231.

The technical proposal of the present disclosure can locating the product ready to be assembled to the special position through the locating member 22, and drives the taking member 23 acquiring screws from the screw feeding member 25 through the driving member 24, and assembles the acquired screws to the corresponding positions of the product ready to be assembled one by one, the whole process of assembling screws is automatically proceeded, no need of manual work, on one hand, labor cost is reduced, on the other hand, the quality problem of the screw assembling is avoid which is caused by issues like workers' physical qualities and emotions, the quality of the product ready to be assembled is improved, on still another the device for automatically assembling screw does not occur the phenomenon of reducing the production efficiency due to fatigue, that is, the screw assembling of the products ready to be assembled can be sustainably proceeded with high efficiency, therefore, the production efficiency of the products ready to be assembled is improved.

In the exemplary embodiment, furthermore, the rotating plate 231 is rotatably connected with the end of the four axis robot. As the end of the four axis robot need to frequently rotate, in order to avoid the phenomenon that the external main windpipe 5 and electric wire occurs frequent bending at the end of the four axis robot, the end of the four axis robot has a rotating connector 241, and connects with the external main windpipe 5 through the rotating connector 241, so that the external main pipe 5 can rotates relating to the end of the four axis robot and does not leak; the end of the four axis robot also has a conductive slip ring (not shown), and connects with the electric wire through the conductive slip ring, so that the electric wire can rotate relating to the end of the four axis robot and do not power off.

Figure 3:
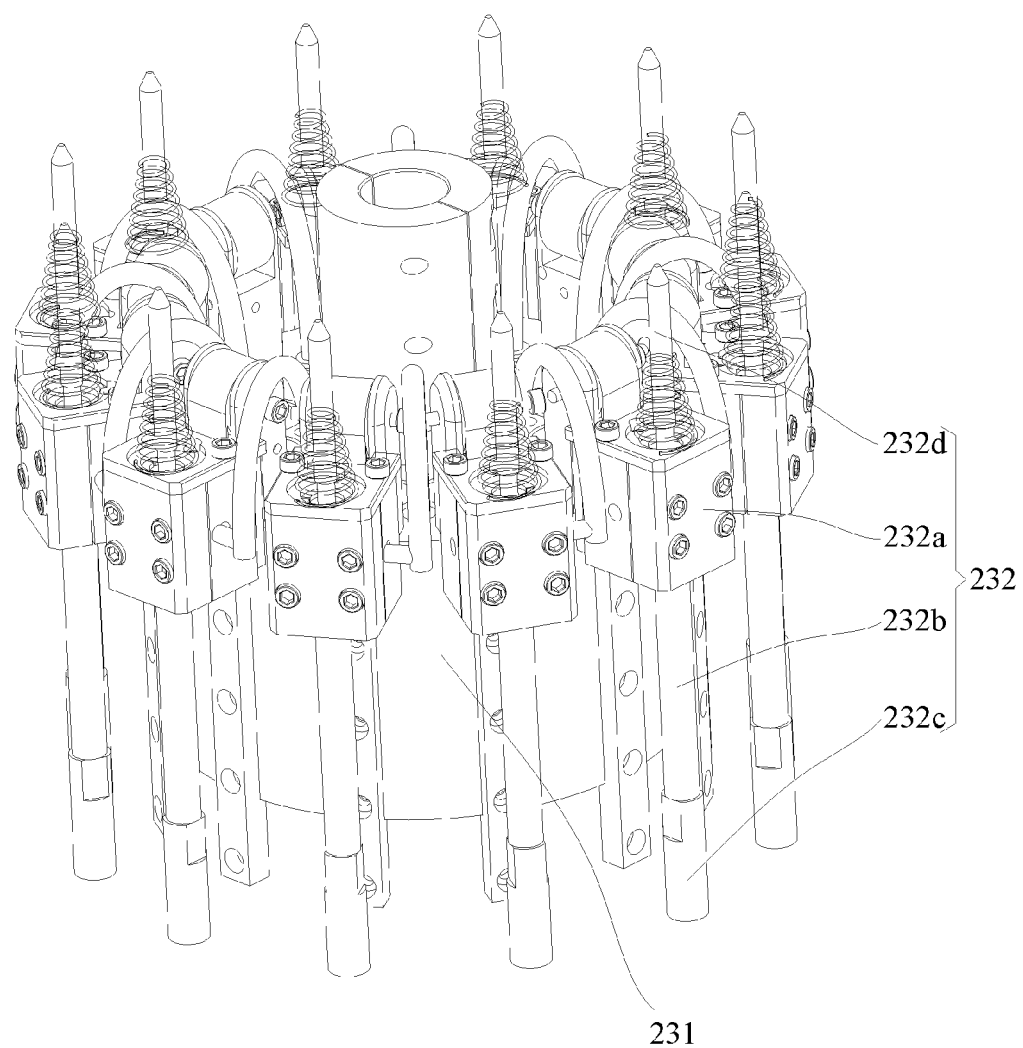
FIG. 3 is a structure diagram of a rotating plate and a sucking element of the taking member shown in FIG. 2.
Figure 4:
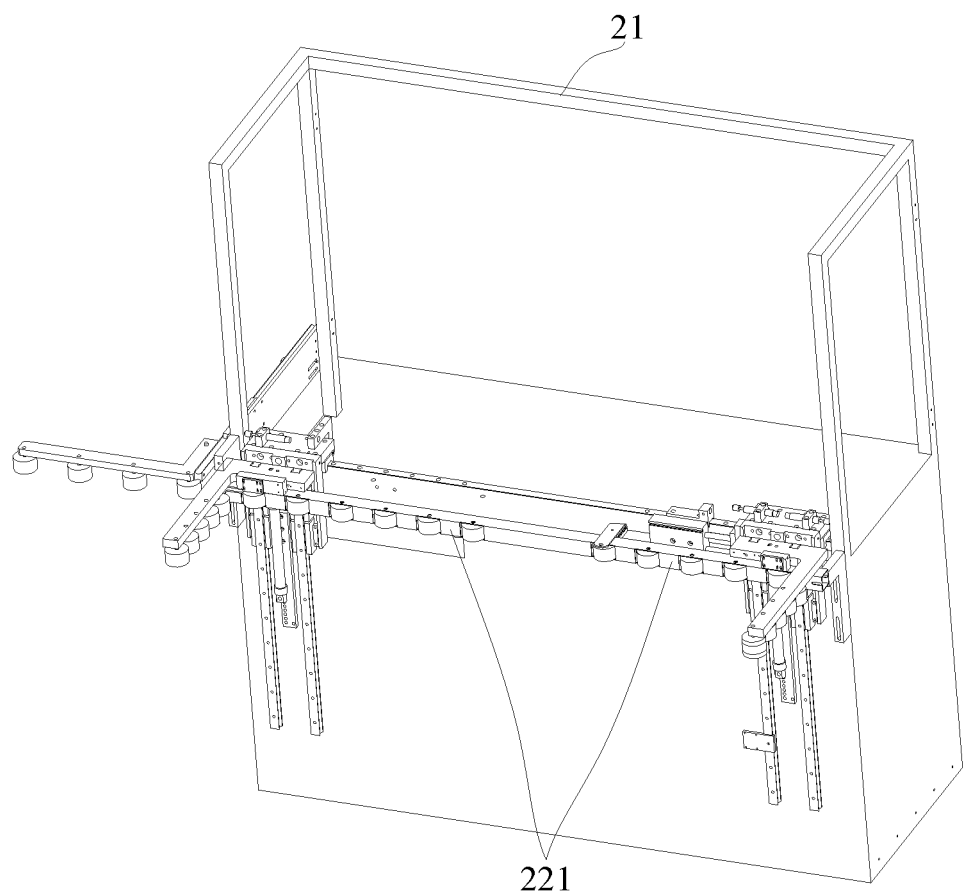
FIG. 4 is a structure diagram of a frame and a horizontal locating device of the locating member of the device for automatically assembling screw shown in FIG. 1.
Figure 5:
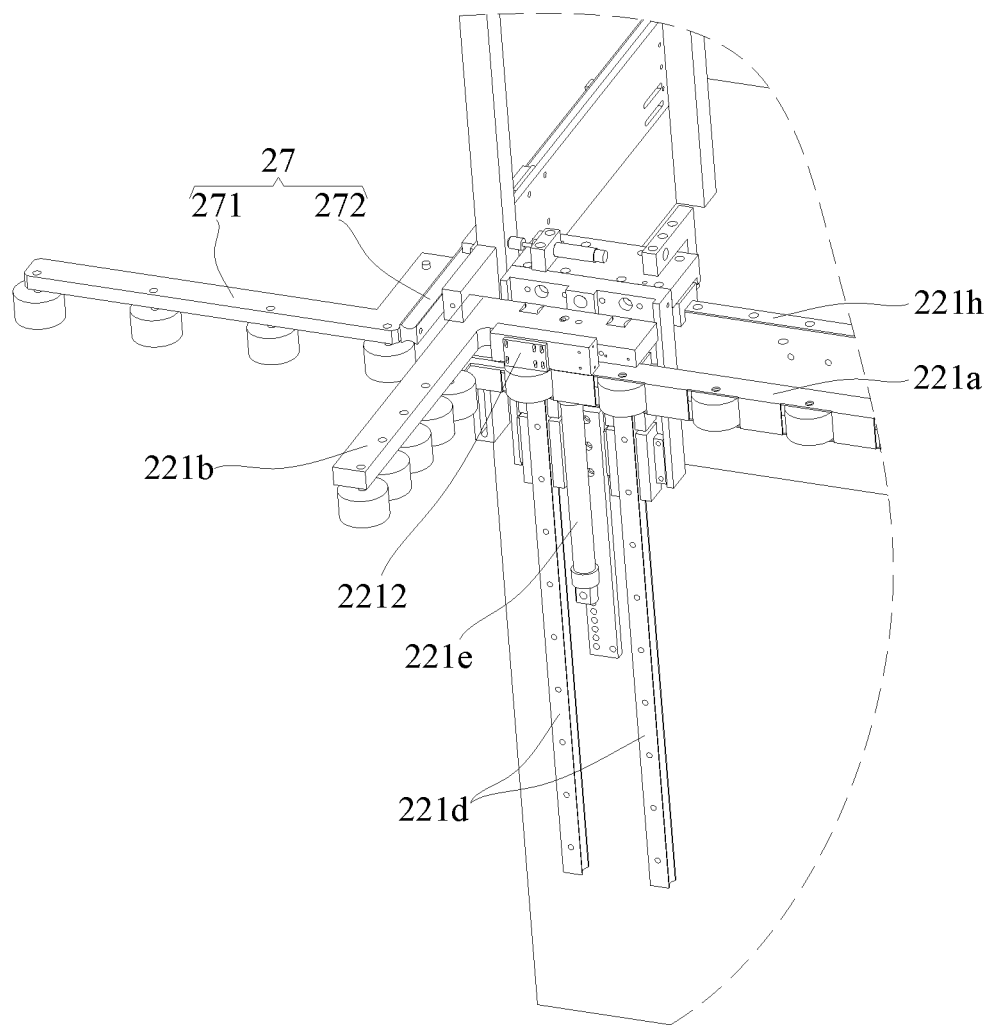
FIG. 5 is structure diagram of a part of the horizontal locating device of the locating member of the device shown in FIG. 4.
Figure 6:
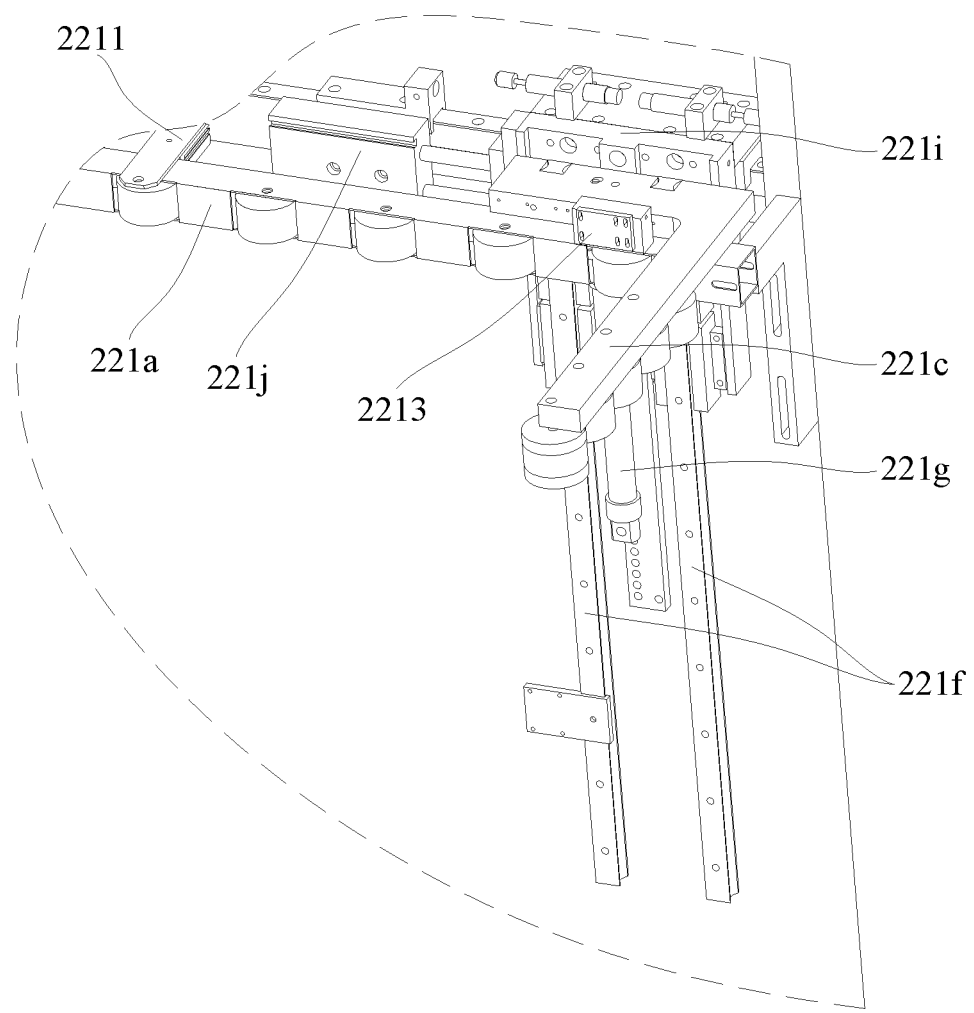
FIG. 6 is structure diagram of another part of the horizontal locating device of the locating member of the device shown in FIG. 4.
Figure 7:
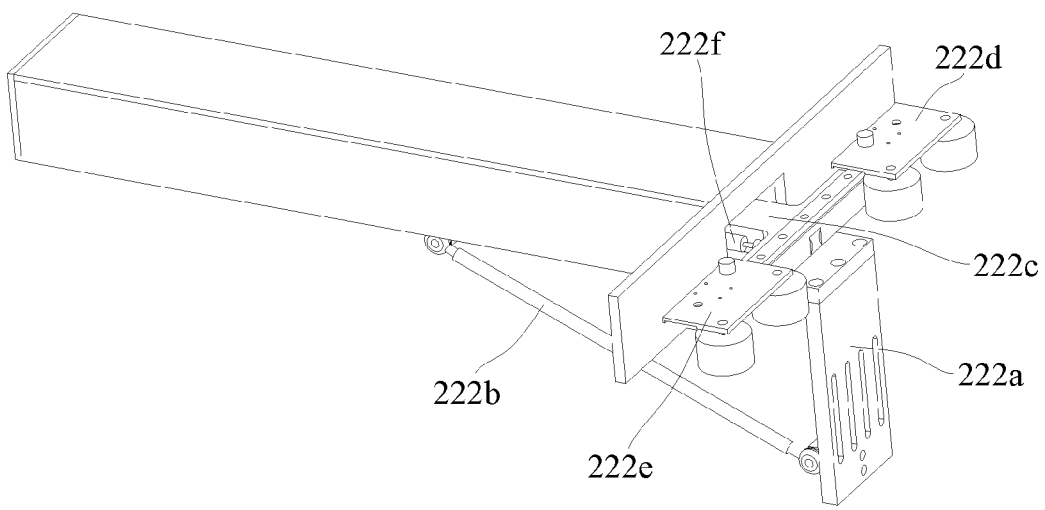
FIG. 7 is a structure diagram of a side-pushing device of the locating member of the device for automatically assembling screw shown in FIG. 1.

Referring to FIG. 3, in the exemplary embodiment, in detail, each sucking element 232 includes a sleeve fixing block 232a fixed on the outer peripheral face of the rotating plate 231, a sleeve 232b fixed on the sleeve fixing block 232a and vertically set, a sucking nozzle 232c located at a bottom of the sleeve 232b, and a bottom batch rod, 232d a lower end of the bottom batch rod 232d is movably sheathed in the sleeve 232b, the bottom batch rod 232d is vertically set. In detail, each sleeve fixing block 232a has a venting interface (not shown) connected with the sleeve 232b and is used for connecting with an external windpipe. In the exemplary embodiment, preferably, the taking member 23 also includes a solenoid valve (not shown) corresponding to the windpipe on the venting interface, the solenoid valve is used for controlling a venting state of corresponding pipe, so that, the motion that each sucking element 232 sucks the screw through the sucking nozzle 232c is independent and controllable. It is to be understood that, the taking member 23 further includes a vacuum generator (not shown) corresponding to the windpipe on the venting interface, the vacuum generator provides negative pressure to the sleeve 232b through the windpipe, for sucking screws through the sucking nozzle 232c.

Referring to FIG. 2, in the exemplary embodiment, in detail, the taking member 23 also includes a connecting plate 234 fixed on the end of the four axis robot, a first guide rail 235 fixed with the connecting plate 234 and vertically set, an electric screwdriver fixing plate 236 movably connected with the first guide rail 235, a first driving element 237 fixed on the connecting plate 234. In the exemplary embodiment, the electric screwdriver 233 is fixed on the electric screwdriver fixing plate 236, an a lower end of the electric screwdriver 233 has the top batch rod 238 which is vertically set, the top batch rod 238 is right above the bottom batch rod 232d. The first driving element 237 is used for driving the electric screwdriver fixing plate 236 moving on the first guide rail 235, and bringing the electric screwdriver 233 vertically moving, that a bottom end of the top batch rod 238 is connected with a top end of the bottom batch rod 232d, so that the electric screwdriver 233 can drive the bottom batch rod 232d rotating through the top batch rod 238, for assembling the screw at the sucking nozzle 232c on the product ready to be assembled. In the exemplary embodiment, preferably, the first driving element 237 is the first air cylinder, the first air cylinder is fixed on the connecting plate 234, and an end of a driving shaft of the first air cylinder is fixed with the electric screwdriver fixing plate 236, so that the first air cylinder can drive the electric screwdriver fixing plate 236 moving on the guide rail 235.

In the exemplary embodiment, the screw feeding member 25 further includes a feeding device connected with the feeding plate 251, the feeding device can adopt the traditional common feeder, no need to repeat its detail principle and structure. Furthermore, the screw feeding member 25 further includes an ejecting member 26 located right under the feeding plate 251, the ejecting member 26 corresponding to each feeding position includes one electromagnetic putter 261, when the electromagnetic putters 261 is energized, the electromagnetic putters 261 would move upwards, for ejecting the screw located at corresponding feeding position. So that, when the sucking nozzle 232c sucks the screw, the electromagnetic putters 261 is energized at the same time, the screw is pushed upward into the sucking nozzle 232c through the electromagnetic putters 261, for improving the success rate and efficiency of sucking screw by sucking nozzle 232c.

Referring to FIGS. 4-7, in the exemplary embodiment, furthermore, the locating member 22 includes a horizontal locating device 221, the horizontal locating device includes: a first roller plate 221a, a second roller plate 221b, a third roller plate 221c, a second guide rail 221d, a second air cylinder 221e, a third guide rail 221f, a third air cylinder 221g, a fourth guide rail 221h, a fourth air cylinder (not shown), a fifth guide rail 221i, and a fifth air cylinder 221j, the first roller plate 221a is horizontally set along a lateral direction, the second roller plate 221b, the second guide rail 221d, and the second air cylinder 221e are all located at an end of the first roller plate 221a along the lateral direction, the third roller plate 221c, the third guide rail 221f and the third air cylinder 221g are all located an opposite end of the first roller plate 221a along the lateral direction, and the second roller plate 221b and the third roller plate 221c are horizontally set along a vertical direction, the second guide rail 221d, the second air cylinder 221e, the third guide rail 221f and the third air cylinder 221g are vertically set, the fourth guide rail 221h, the fourth air cylinder, the fifth guide rail 221i and the fifth air cylinder 221j are all located at a side of the first roller plate 221a along the lateral direction. In detail, the second roller plate 221b is movably connected with the second guide rail 221d, and the second roller plate 221b is fixed with an end of a driving shaft of the second air cylinder 221e, the second air cylinder 221e is used for driving the second roller plate 221b vertically moving along the second guide rail 221d. The second guide rail 221d is movably connected with the fourth guide rail 221h, and the second guide rail 221d is fixed with an end of a driving shaft of the fourth air cylinder (not shown), the fourth air cylinder is used for driving the second guide rail 221d horizontally moving along the fourth guide rail 221h. Preferably, the second roller plate 221b and the third roller plate 221c have a second locating in place air cylinder 2212 and the third locating in place air cylinder 2213 respectively. Similarly, the third roller plate 221c is movably connected with the third guide rail 221f, and the third roller plate 221c is fixed with an end of a driving shaft of the third air cylinder 221g, the third guide rail 221c is movably connected with the fifth guide rail 221i, and the third guide rail 221f is fixed with an end of a driving shaft of the fifth air cylinder 221j; the third air cylinder 221g is used for driving the third roller plate 221c vertically moving along the third guide rail 221f, and the fifth air cylinder 221j is used for driving the third guide rail 221f horizontally moving along the fifth guide rail 221i. Preferably, the first roller plate 221a has a first locating in place air cylinder 2211.

In the exemplary embodiment, furthermore, the locating member 22 further includes a side-pushing device 222 used for pushing the product ready to be assembled to be contacted with a surface of the first roller plate 221a, the side-pushing device 222 includes: an assembling plate 222a vertically set along a lateral direction, a supporting rod 222b located at a bottom end of the assembling plate 222a, a T shaped pushing rod 222c located at a top end of the assembling plate 222a, a fourth roller plate 222 and a fifth roller plate 222e horizontally set along the lateral direction, a sixth air cylinder 222f horizontally set along a vertical direction. In detail, the T shaped pushing rod 222c includes a cross bar horizontally set along the lateral direction, and a vertical bar horizontally set along the vertical direction, the fourth roller plate 222d and the fifth roller plate 222e are located at the cross bar and separately located at two opposite sides of the cross bar; a top end of the assembling plate 222a has a six guide rail (not shown), the vertical bar of the T shaped pushing rod 222c is movably connected with the sixth guide rail, and the cross bar of the T shaped pushing rod 222c is fixed with an end of a driving shaft of the sixth air cylinder 222f, so that the sixth air cylinder 222f drives the T shaped pushing rod 222c horizontally moving along the vertical direction.

In the exemplary embodiment, furthermore, the device for automatically assembling screw further includes a position correctional member 27 used for correcting the position of the product ready to be assembled, the position correctional member 27 includes: the sixth roller plate 271 horizontally set along a lateral direction, a seventh guide rail 272 vertically set along the lateral direction and a seventh air cylinder (not shown). In detail, the sixth roller plate 271 is movably connected with the seventh guide rail 272, and fixed with the end of the driving shaft of the seventh air cylinder, and drives the sixth roller plate 271 moving along the seventh guide rail 272 through the seventh air cylinder to vertically move along the lateral direction. When the product ready to be assembled by the screw flows to a next station and stops, the sixth roller plate 271 pushes the product ready to be assembled to move for a distance under the driving of the seventh air cylinder, so that the product ready to be assembled stops at a suitable position, for convenience the operation of worker at the back station.

In the exemplary embodiment, in detail, the first roller plate 221a, the second roller plate 221b, the third roller plate 221c, the fourth roller plate 222d, the fifth roller plate 222e and the sixth roller plate 271 all have a plurality of rollers arranged side-by-side, so that, during the process of pushing the product ready to be assembled, the phenomenon of scratching the appearance of the product ready to be assembled occurs is avoided by the contacting of the rollers with the edges of the product ready to be assembled.

Referring to FIG. 1, the present disclosure further provides an automatically assembling system, the automatically assembling system includes an assembling line body 1, a plurality of placing plates 3 located at the assembling line body 1 and used for placing product ready to be assembled, and the device for automatically assembling screw, the detail structure of the device for automatically assembling screw is referred to the above exemplary embodiment, as the automatically assembling system adopts all the technical proposal of above exemplary embodiments, so that the automatically assembling system at least has all the beneficial effects brought by the technical proposal of the above exemplary embodiments, no need to repeat again. In which, the device for automatically assembling screw corresponds to the position of the placing plate 3, and the screws are assembled to the corresponding positions of the product ready to be assembled through the device for automatically assembling screw. In which, the stopper 4 which can rise and fail can be located at two adjacent placing plates 3. In the exemplary embodiment, in detail, the locating member 22, the taking member 23, the four axis robot and the screw feeding member 25 can all be located at the frame 21, in which, the horizontal locating device 221 of the locating member 22, the taking member 23, the four axis robot and the screw feeding member 25 is located close to a side of the assembling line body 1, and the locating member 22 corresponds to the position of the placing plate 3. In addition, the side-pushing device 222 of the locating member 22 is located at the other side of the assembling line body 1, and is used along with the horizontal locating device 221 of the locating member 22, while the position correctional member 27 corresponds to the position of the placing plate 3 of the next station.

The detail operation process and the working principle of the present disclosure is further explained as blow:

The placing plate 3 having the product ready to be assembled flows on the assembling line from right to left, after flowing to the station of assembling screw, the stopper 4 stops the placing plate 3, for stopping the placing plate 3 and the product ready to be assembled at the current station.

When the product ready to be assembled arrives at the station, under the driving of the second air cylinder 221e, the second roller plate 221b moves down along the second guide rail 221d, when a lower surface of the roller of the second roller plate 221b is flush with a low surface of the product ready to be assembled, the second air cylinder 221e stops driving; then, under the driving of the third air cylinder 221g, the second guide rail 221d and the second roller plate 221b fixed with the second guide rail 221d horizontally moves towards right along the fourth guide rail 221h. At the same time, under the driving of the third air cylinder 221g, the third roller plate 221c moves downward along the third guide rail 221f, when a lower surface of the roller of the third roller plate 221c is flush with a low surface of the product ready to be assembled, the third roller plate 221 stops driving; then, under the driving of the fifth air cylinder 221j, the third guide rail 221f and the third roller plate 221c fixed with the third guide rail 221f horizontally moves towards left along the fifth guide rail 221i. Until the product ready to be assembled is clamped by the rollers of the second roller plate 221b and the third roller plate 221c, after the product ready to be assembled is clamped, the second locating in place air cylinder 2212 and the third locating in place air cylinder 2213 would send signal to the system, the product ready to be assembled has been located at a length direction. Then, the T shaped pushing rod protrudes from a safety cover under the driving of the sixth air cylinder 222f, and pushes the product ready to be assembled forward, until another the other long side of the product ready to be assembled is pushed to be contacted with the surface of the rollers on the first roller plate 221a, and the product ready to be assembled stops, at this time, the first locating in place air cylinder 2211 would send signal to the system, the product ready to be assembled is located at the width direction.

After the product ready to be assembled is located, worker moves the sucking nozzles 232c of at least three sucking elements 232 of the taking member to right on corresponding screw holes respectively by manual first, after matching, the coordinate of each screw hole is recorded and saved in the system respectively, the position coordinate of the product ready to be assembled of each model can be got by the matching according to the manual mode as illustrated above, then the model is produced, no need to match again.

When the product ready to be assembled is located, and the coordinate of the screw hole of the product ready to be assembled is ready, at least three sucking elements 232 of the taking member 23 are driven by the four axis robot to move to the top of the feeding plate 251 and ensures that all the sucking elements 232 matches with the feeding positions on the feeding plate 251 respectively by rotating the rotating plate 231. After matching, the four axis robot drives the whole of the taking member 23 declining, until after the sucking nozzle 232c connects with the feeding plate 251, the solenoid valve of the feeding member 23 controls the on-off of corresponding pipe according to the preset situation, so that the sucking nozzle 232c generating negative pressure sucks screw. The solenoid valve starts, at the same time, corresponding electromagnetic putter powers on, so that the sore pushed into the nozzle 232c. After the screws are sucked, negative pressure value of the vacuum generator will change, the changing of the negative pressure value can be regarded as the feedback signal which is that whether the screw sucked. After the system receives the feedback signal that each screw is sucked, the sucking nozzle 232c of one sucking element 232 moves to the top of the first screw hole ready to be assembled through the four axis robot, then the whole of the taking member 23 declines, after the taking member 23 declines to a certain height, the driving shaft of the first air cylinder shrinks, so that the electric screwdriver 233 and the top batch rod 238 are brought to move downward along the first guide rail 235 through the electric screwdriver fixing plate 236, until the top batch rod 238 and the bottom batch rod 232d are connected with each other, then, the electric screwdriver 233 brings the top batch rod 238 to rotate, for bringing the bottom batch rod 232d to rotate inside the sleeve 232b and the sucking nozzle 232c, when the bottom batch rod 232d rotates the driving shaft of the first air cylinder always remains shrinking state, so that the bottom batch rod 232d has continuous downward pressure, for assembling the screw into the screw hole, after the screw is assembled, the electric screwdriver 233 blocks, the feedback signal is sent to the system, the system drives the whole of the taking member 23 rising through the four axis robot. After all the sucking elements 232 rise to the safety height, the four axis robot drives the rotating plate 231 rotating a preset angle (when the number of the sucking elements is twelve, the preset angle is 30°), adjacent sucking elements 232 rotate right below the top batch rod 238, then, the four axis robot moves the sucking elements 232 right upon the second screw hole ready to be assembled, the assembling screw motion is repeated. Such repeated, until the sucked screws are all treated.

After the sucked screws are all treated, the second roller plate 221b and the third roller plate 221c would move upward under the driving of the second air cylinder 221e and the third air cylinder 221g, and move toward left and right respectively under the driving the fourth air cylinder and the fifth air cylinder 221j. At the same time, the T shaped pushing rod, the fourth roller plate 222d and the fifth roller plate 222e are all driven to back away by the sixth air cylinder 222f. Then, the stopper 4 move downward, the placing plate 3 having the product ready to be assembled flows away from the station. During the above motion, during the driving of the four axis robot, the taking member 23 moves to the top of the screw feeding member 25 and sucks the screw, and stops right upon corresponding first screw hole ready to be assembled, waits the coming of next product ready to be assembled, repeats the assembling motion. In addition, after the product assembled with the screw flows to the next station and stops, the sixth roller plate 271 pushes the product ready to be assembled forward for a distance driven by the seventh air cylinder, so that the product ready to be assembled stops at the proper position, so that worker at the back station can easily operate, so far, the whole circle finishes.

The embodiments above are preferably embodiments of the present disclosure, and the present disclosure is not to such embodiments, equivalent structure conversion based on the specification and the drawing of the present disclosure, or directly or indirectly used in other related technical field, both similarly within the protection scope of the present disclosure.

We claim:

1. A device for automatically assembling at least one screw to a product ready to be assembled, the device comprising a frame, a locating member located on the frame, a taking member, a driving member and a screw feeding member:
    the locating member being used for locating the product ready to be assembled at a location;
    the taking member comprising a rotating plate connected with the driving member, at least three sucking elements fixed below the rotating member and located at a same circumference relative to a center of the rotating plate, and an electric screwdriver connected with the driving member and located upon the circumference; the driving member being capable of rotating the rotating plate, the electric screwdriver being movably located on the driving member;
    the screw feeding member comprising a feeding plate, the feeding plate comprising a plurality of feeding positions, each feeding position corresponding to one sucking element;
    the driving member being capable of driving the sucking element in order to acquire the at least one screw from one of the plurality of corresponding feeding positions, and the driving member being capable of moving the sucking element and the acquired screw to an assembling position of the product ready to be assembled where the electric screwdriver assembles the screw to the product ready to be assembled.

2. The device for automatically assembling the at least one screw according to claim 1, wherein the sucking member comprises a sleeve fixing block fixed on the rotating plate, a vertically oriented sleeve fixed on the sleeve fixing block, a sucking nozzle located at a bottom of the sleeve, and a bottom batch rod, a lower end of the bottom batch rod being movably sheathed in the sleeve, the bottom batch rod being vertically oriented, the sleeve fixing block has a venting interface connected with the sleeve, the venting interface being connected to an external windpipe.

3. The device for automatically assembling the at least one screw according to claim 2, wherein the taking member further comprises a solenoid valve corresponding to the windpipe connected to the venting interface, the solenoid valve being capable of controlling a venting state of a corresponding pipe.

4. The device for automatically assembling the at least one screw according to claim 3, wherein the sucking members are uniformly located at the circumference.

5. The device for automatically assembling the at least one screw according to claim 3, wherein the driving member is a four axis robot and the rotating plate is movably connected to an end of the four axis robot;
    wherein the taking member further comprises a connecting plate fixed on the end of the four axis robot, a vertically oriented first guide rail fixed with the connecting plate, an electric screwdriver fixing plate movably connected with the first guide rail, a first driving element fixed on the connecting plate, the electric screwdriver being fixed on the electric screwdriver fixing plate, and a lower end of the electric screwdriver includes a vertically oriented top batch rod, the top batch rod being located above the bottom batch rod;
    the first driving element being capable of driving the electric screwdriver fixing plate such that it moves along the first guide rail and causes the electric screwdriver to move vertically such that a bottom end of the top batch rod is connected with a top end of the bottom batch rod.

6. The device for automatically assembling the at least one screw according to claim 5, wherein the end of the four axis robot has a rotating connector capable of connecting with an external main pipe, and a conductive slip ring capable of connecting with an electric wire.

7. The device for automatically assembling the at least one screw according to claim 2, wherein the sucking members are uniformly located at the circumference.

8. The device for automatically assembling the at least one screw according to claim 2, wherein the driving member is a four axis robot and the rotating plate is movably connected to an end of the four axis robot;
    wherein the taking member further comprises a connecting plate fixed on the end of the four axis robot, a vertically oriented first guide rail fixed with the connecting plate, an electric screwdriver fixing plate movably connected with the first guide rail, a first driving element fixed on the connecting plate, the electric screwdriver being fixed on the electric screwdriver fixing plate, and a lower end of the electric screwdriver includes a vertically oriented top batch rod, the top batch rod being located above the bottom batch rod;
    the first driving element being capable of driving the electric screwdriver fixing plate such that the it moves along the first guide rail and causes the electric screwdriver to move vertically such that a bottom end of the top batch rod is connected with a top end of the bottom batch rod.

9. The device for automatically assembling the at least one screw according to claim 8, wherein the end of the four axis robot has a rotating connector capable of connecting with an external main pipe, and a conductive slip ring capable of connecting with an electric wire.

10. The device for automatically assembling the at least one screw according to claim 1, wherein the screw feeding member further comprises an ejecting member boated below the feeding plate, the ejecting member comprising a plurality of electromagnetic putters, each electromagnetic putter corresponding to one feeding position.

11. The device for automatically assembling the at least one screw according to claim 1, wherein the locating member comprises a first roller plate, a second roller plate, a third roller plate, a second guide rail, a second air cylinder, a third guide rail, a third air cylinder, a fourth guide rail, a fourth air cylinder, a fifth guide rail and a fifth air cylinder, the first roller plate being horizontally oriented along a lateral direction, the second roller plate, the second guide rail, and the second air cylinder all being boated at an end of the first roller plate along the lateral direction, the third roller plate, the third guide rail and the third air cylinder all being boated an opposite end of the first roller plate along the lateral direction, and the second roller plate and the third roller plate being oriented horizontally along a vertical direction, the second guide rail, the second air cylinder, the third guide rail and the third air cylinder being vertically oriented, the fourth guide rail, the fourth air cylinder, the fifth guide rail and the fifth air cylinder all being located at a side of the first roller plate along the lateral direction;
the second roller plate being movably connected with the second guide rail, and the second roller plate being fixed to an end of a driving shaft of the second air cylinder the second air cylinder being capable of driving the second roller plate vertically along the second guide rail; the second guide rail being movably connected with the fourth guide rail, and the second guide rail being fixed with an end of a driving shaft of the fourth air cylinder, the fourth air cylinder being capable of driving the second guide rail horizontally along the fourth guide rail;
the third roller plate being movably connected with the third guide rail, and the third roller plate being fixed with an end of a driving shaft of the third air cylinder, the third air cylinder being capable of driving the third roller plate vertically along the third guide rail; the third guide rail being movably connected with the fifth guide rail, and the third guide rail being fixed with an end of a driving shaft of the fifth air cylinder, the fifth air cylinder being capable of driving the third guide rail horizontally along the fifth guide rail.

12. The device for automatically assembling the at least one screw according to claim 11, wherein the locating member further comprises a side-pushing device capable of pushing the product ready to be assembled into contact with a surface of the first roller plate, wherein the side-pushing device comprises; an assembling plate vertically oriented along a lateral direction, a supporting rod located at a bottom end of the assembling plate, a T-shaped pushing rod located at a top end of the assembling plate, a fourth roller plate and a fifth roller plate horizontally oriented along the lateral direction, a sixth air cylinder horizontally oriented along a vertical direction; the T-shaped pushing rod comprising a cross bar horizontally oriented along the lateral direction, and a vertical bar horizontally oriented along the vertical direction, the fourth roller plate and the fifth roller plate being located at the cross bar and being separately located at two opposite sides of the cross bar;
a top end of the assembling plate including a six guide rail, the vertical bar being movably connected with the sixth guide rail, and the cross bar being fixed with an end of a driving shaft of the sixth air cylinder, the sixth air cylinder being capable driving the T-shaped pushing rod horizontally—along the vertical direction.

13. An automatically assembling system, comprising an assembling line body, a plurality of placing plates located at the assembling line body and used for placing a product ready to be assembled, and a device for automatically assembling at least one screw, the device for automatically assembling the at least one screw corresponding to positions of the placing plates, wherein, the device for automatically assembling the at least one screw comprises a frame, a locating member located on the frame, a taking member, a driving member and a screw feeding member:
the locating member being used for locating the product ready to be assembled at a location;
the taking member comprising a rotating plate connected with the driving member, at least three sucking elements fixed below the rotating member and located at a same circumference relative to a center of the rotating plate, and an electric screwdriver connected with the driving member and located upon the circumference; the driving member being capable of rotating the rotating plate, the electric screwdriver being movably located on the driving member;
the screw feeding member comprising a feeding plate, the feeding plate comprising a plurality of feeding positions, each feeding position corresponding to one sucking element;
the driving member being capable of driving the sucking element in order to acquire the at least one screw from one of the plurality of corresponding feeding positions, and the driving member being capable of moving the sucking element and the acquired screw to an assembling position of the product ready to be assembled where the electric screwdriver assembles the screw to the product ready to be assembled.

14. The automatically assembling system according to claim 13,
wherein the sucking member comprises a sleeve fixing block fixed on the rotating plate, a vertically oriented sleeve fixed on the sleeve fixing block, a sucking nozzle located at a bottom of the sleeve, and a bottom batch rod, a lower end of the bottom batch rod being movably sheathed in the sleeve, the bottom batch rod being vertically oriented, the sleeve fixing block has a venting interface connected with the sleeve, the venting interface being connected to an external windpipe.

15. The automatically assembling system according to claim 14,
wherein the taking member further comprises a solenoid valve corresponding to the windpipe connected to the venting interface, the solenoid valve being capable of controlling a venting state of a corresponding pipe.

16. The automatically assembling system according to claim 14,
wherein the driving member is a four axis robot and the rotating plate is movably connected to an end of the four axis robot;
wherein the taking member farther comprises a connecting plate fixed on the end of the four axis robot, a vertically oriented first guide rail fixed with the connecting plate, an electric screwdriver fixing plate movably connected with the first guide rail, a first driving element fixed on the connecting plate, the electric screwdriver being fixed on the electric screwdriver fixing plate, and a lower end of the electric screwdriver includes a vertically oriented top batch rod, the top batch rod being located above the bottom batch rod;

the first driving element being capable of driving the electric screwdriver fixing plate such that it moves along the first guide rail and causes the electric screwdriver to move such that a bottom end of the top batch rod is connected with a top end of the bottom batch rod.

17. The automatically assembling system according to claim 16, wherein the end of the four axis robot has a rotating connector capable of connecting with an external main pipe, and a conductive slip ring capable of connecting with an electric wire.

18. The automatically assembling system according to claim 13, wherein the screw feeding member further comprises an ejecting member located below the feeding plate, the ejecting member comprising a plurality of electromagnetic putters, each electromagnetic putter corresponding to one feeding position.

19. The automatically assembling system according to claim 13, wherein the locating member comprises a first roller plate, a second roller plate, a third roller plate, a second guide rail, a second air cylinder, a third guide rail, a third air cylinder, a fourth guide rail, a fourth air cylinder, a fifth guide rail and a fifth air cylinder, the first roller pate being horizontally oriented along a lateral direction, the second roller plate, the second guide rail, and the second air cylinder all being located at an end of the first roller plate which along a lateral direction, the third roller plate, the third guide rail and the third air cylinder all being located an opposite end of the first roller plate along the lateral direction, and the second roller plate and the third roller plate being horizontally oriented along a vertical direction, the second guide rail, the second air cylinder, the third guide rail and the third air cylinder being vertically oriented, the fourth guide rail, the fourth air cylinder, the fifth guide rail and the fifth air cylinder all being located at a side of the first roller plate along the lateral direction;

the second roller plate being movably connected with the second guide rail, and the second roller plate being fixed to an end of a driving shaft of the second air cylinder, the second air cylinder being capable of driving the second roller plate vertically along the second guide rail; the second guide rail being movably connected with the fourth guide rail, and the second guide rail being fixed with an end of a driving shaft of the fourth air cylinder, the fourth air cylinder being capable of driving the second guide rail horizontally moving along the fourth guide ran;

the third roller plate being movably connected with the third guide rail, and the third roller plate being fixed to an end of a driving shaft of the third air cylinder, the third air cylinder being capable of driving the third roller plate vertically along the third guide ran; the third guide rail is movably connected with the fifth guide rail, and the third guide rail is fixed with an end of a driving shat of the fifth air cylinder, the fifth air cylinder being capable of driving the third guide rail horizontally moving along the fifth guide rail.

20. The automatically assembling system according to claim 19, wherein the locating member further comprises a side-pushing device capable of pushing the product ready to be assembled into contact with a surface of the first roller plate, wherein the side-pushing device comprises: an assembling plate vertically oriented along a lateral direction, a supporting rod boated at a bottom end of the assembling plate, a T-shaped pushing rod boated at a top end of the assembling plate, a fourth roller plate and a fifth roller plate horizontally oriented along the lateral direction, a sixth air cylinder horizontally set along a vertical direction; the T-shaped pushing rod comprising a cross bar horizontally oriented along the lateral direction, and a vertical bar horizontally set along the vertical direction, the fourth roller plate and the fifth roller plate being located at the cross bar and being separately located at two opposite sides of the cross bar;

a top end of the assembling plate including a six guide rail, the vertical bar being movably connected with the sixth guide rail, and the cross bar being fixed with an end of a driving shaft of the sixth air cylinder, the sixth air cylinder being capable of driving the T shaped pushing rod horizontally along the vertical direction.

* * * * *